United States Patent
Anderson et al.

(10) Patent No.: US 7,609,693 B2
(45) Date of Patent: Oct. 27, 2009

(54) MULTICAST PACKET QUEUING

(75) Inventors: Eric Anderson, Palo Alto, CA (US);
Philip Ferolito, Sunnyvale, CA (US);
Mike Morrison, Sunnyvale, CA (US);
Mindong Chen, San Jose, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1254 days.

(21) Appl. No.: 10/443,505

(22) Filed: May 22, 2003

(65) Prior Publication Data
US 2004/0017810 A1   Jan. 29, 2004

Related U.S. Application Data

(60) Provisional application No. 60/385,953, filed on Jun. 4, 2002.

(51) Int. Cl.
*H04L 12/28* (2006.01)
(52) U.S. Cl. ..................................... 370/390
(58) Field of Classification Search ............... 370/401, 370/412, 428, 429, 390, 432
See application file for complete search history.

(56) References Cited

U.S. PATENT DOCUMENTS

| | | | |
|---|---|---|---|
| 5,592,476 A * | 1/1997 | Calamvokis et al. ......... | 370/390 |
| 5,602,841 A * | 2/1997 | Lebizay et al. ............... | 370/413 |
| 5,898,687 A | 4/1999 | Harriman et al. | |
| 6,272,567 B1 * | 8/2001 | Pal et al. ........................ | 710/56 |
| 6,335,935 B2 * | 1/2002 | Kadambi et al. ............. | 370/396 |
| 6,560,237 B1 * | 5/2003 | Hiscock et al. .............. | 370/412 |
| 6,707,817 B1 * | 3/2004 | Kadambi et al. ............. | 370/390 |
| 6,795,886 B1 * | 9/2004 | Nguyen ....................... | 710/310 |
| 6,977,930 B1 * | 12/2005 | Epps et al. ................... | 370/392 |
| 7,110,415 B1 * | 9/2006 | Walsh et al. ................. | 370/414 |
| 7,209,440 B1 * | 4/2007 | Walsh et al. ................. | 370/230 |
| 2002/0089977 A1 | 7/2002 | Chang et al. | |
| 2003/0053470 A1 * | 3/2003 | Divivier ...................... | 370/412 |
| 2004/0008716 A1 * | 1/2004 | Stiliadis ....................... | 340/429 |

* cited by examiner

*Primary Examiner*—Frank Duong
(74) *Attorney, Agent, or Firm*—Wilson & Ham Patent Attorneys

(57) ABSTRACT

A traffic forwarding system that uses a multicast start-of-packet (SOP) pointer to enqueue a multicast packet in packet queues. The system receives cells, assigns pointers to the cells, and stores the received cells in memory. The system assigns multicast SOP pointers to multicast SOP cells. The system reassembles cells into packets and enqueues the packets in packet queues for forwarding. A multicast packet is enqueued in a plurality of packet queues. The memory in which the multicast packet is stored is released after the multicast packet is dequeued from each of the plurality of packet queues.

20 Claims, 10 Drawing Sheets

MULTICAST PACKET QUEUING

CROSS REFERENCE TO RELATED APPLICATION

This application is entitled to the benefit of provisional Patent Application Ser. No. 60/385,953, filed Jun. 4, 2002.

FIELD OF THE INVENTION

The present invention relates generally to packet-based traffic forwarding, and more particularly to the queuing of multicast packets.

BACKGROUND OF THE INVENTION

Packet-switched networks are responsible for forwarding packet-based traffic. In some hardware devices, such as switches and routers, packets are broken into fixed-length cells and forwarded from an ingress module, across a switching fabric, to an egress module, where the cells are typically reassembled into packets. After reassembly, the packets are typically enqueued in packet queues for transmission to a destination that is dependent upon the information in the packet headers.

Packets are either unicast (UC) or multicast (MC). A MC packet has multiple destinations. Typically, a MC packet is enqueued one time for each destination. Enqueuing a MC packet one time for each destination uses up memory resources. Moreover, writing packets to memory one time per destination consumes write memory bandwidth resources.

In view of the desire to enqueue MC packets for transmission, what is needed is a packet queuing system that uses memory and processing resources efficiently.

SUMMARY OF THE INVENTION

A technique for efficiently queuing multicast (MC) packets for transmission involves allocating a MC pointer for the first cell of a MC packet. The advantages of utilizing this technique include storing a MC packet only one time in packet memory, thereby improving memory and write bandwidth resource utilization to, for example, allow more packets to be written per unit of time.

An embodiment of the invention includes associating a multicast pointer with a multicast packet, keeping track of valid destinations to which the multicast packet is directed, but to which a copy of the multicast packet has not been sent, and recycling the multicast pointer after a copy of the multicast packet is sent to each of the valid destinations.

Another embodiment of the invention includes maintaining a first queue associated with a first destination, maintaining a second queue associated with a second destination, enqueuing a multicast start-of-packet (SOP) pointer associated with a packet on the first queue, and enqueuing the multicast SOP pointer on the second queue.

Another embodiment of the invention is a system that includes a receive module configured to receive cells, including a first cell and a second cell, determine that the first cell is a multicast start-of-packet (SOP) cell, establish that the second cell is a unicast SOP cell, associate a first type of pointer with the first cell in accordance with said determination, and associate a second type of pointer with the second cell in accordance with said establishing. The system further includes a plurality of packet queues configured to enqueue the first cell in a subplurality of the plurality of packet queues and enqueue the second cell in one of the plurality of packet queues, wherein the first cell is associated with a first reassembled packet and the second cell is associated with a second reassembled packet. And the system includes a transmit module configured to transmit the reassembled packets.

Using the above-described techniques, the efficient queuing and transmission of MC packets is accomplished.

Exemplary figures illustrate embodiments of the invention that illustrate methods and systems for efficiently queuing MC packets for transmission. Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
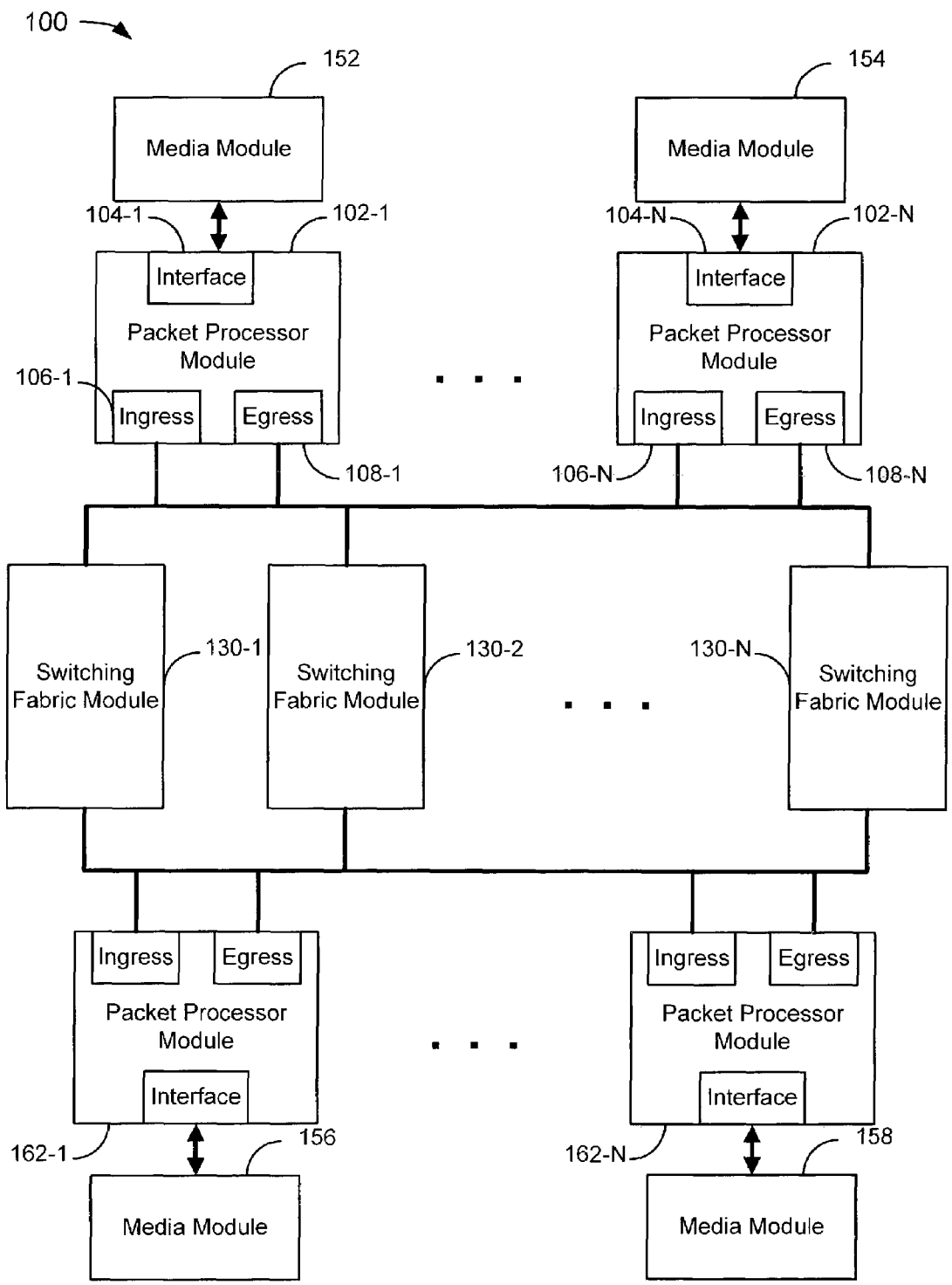
FIG. 1 is a block diagram of a traffic forwarding system in accordance with an embodiment of the invention.

As shown in the drawings for the purposes of illustration, an embodiment of the invention is a system for reassembling packets using cells received across a plurality of switching fabrics.

FIG. 1 is a block diagram of a traffic forwarding system 100 in accordance with an embodiment of the invention. The system 100 includes media modules 152, 154, 156, and 158, packet processor modules 102-1 to 102-N (referred to collectively as the packet processor modules 102) and 162-1 to 162-N (referred to collectively as the packet processor modules 162), and switching fabric modules 130-1 to 130-N (referred to collectively as the switching fabric modules 130). The media modules 152, 154, 156, and 158 are respectively coupled to the packet processor modules 102-1, 102-N, 162-1, and 162-N. It should be noted that each packet processor module might be coupled to two or more media modules (not shown). The packet processor modules 102 and 162 are coupled to the switching fabric modules 130. The switching fabric modules 130 include circuitry to replicate cells by writing to multiple buffers. This functionality may be used with multicast (MC) cells that target a plurality of destinations. The packet processor module 102-1 includes an interface module 104-1 for forwarding packets to and from the media module 152, an ingress module 106-1 for forwarding cells to the switching fabric modules 130, and an egress module 108-1 for receiving cells from the switching fabric modules 130. The packet processor modules 102 and 162 have comparable components and couplings. In an embodiment, the interface modules 104 are configured to receive packets. If a packet is larger than the cell size, it is broken into portions and each portion is encapsulated in a separate cell. The system 100 handles traffic in discrete units, often referred to as datagrams. In an embodiment, the system 100 is an Ethernet switch or an Ethernet router that forwards traffic within the system 100 using Layer 2, Layer 3, and/or Layer 4 header information. The system 100 may include line cards that support network protocols such as Ethernet, ATM, and Frame Relay. Although an Ethernet-based switch/router is described, the disclosed cell reassembly techniques can be applied to any system that has multiple switching fabrics.

Figure 2:
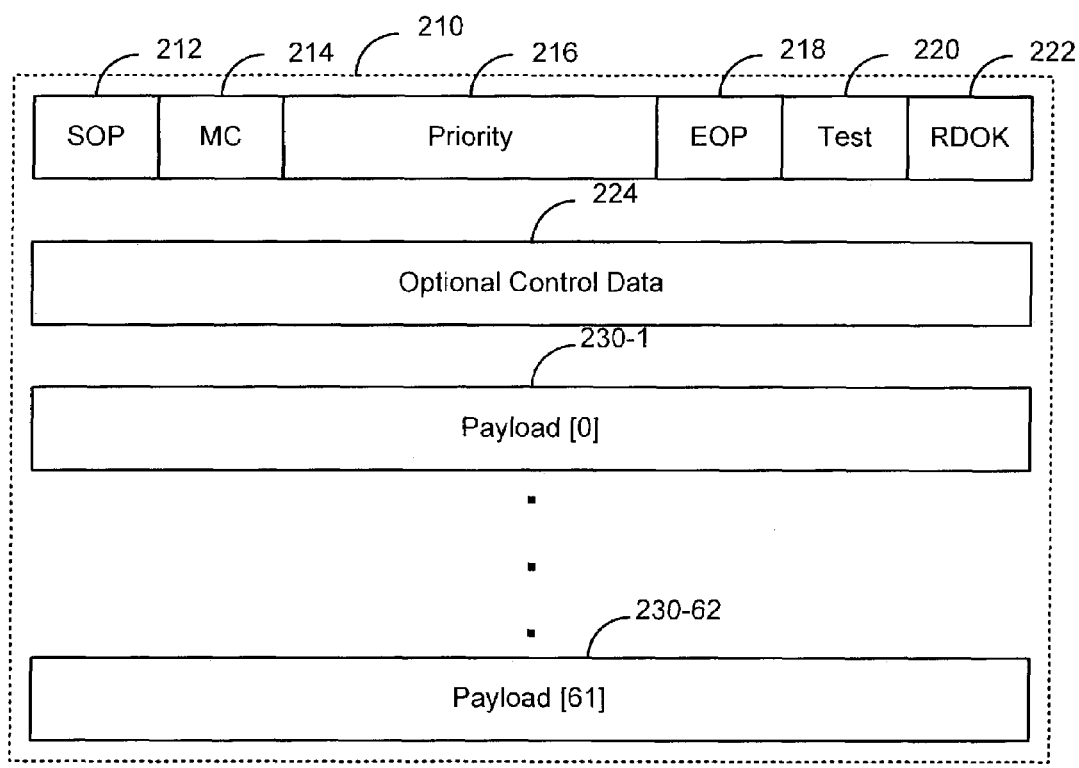
FIG. 2 is a block diagram of an exemplary cell for use with the system of FIG. 1 in accordance with an embodiment of the invention.

FIG. 2 is a block diagram of an exemplary cell 200 for use with the system 100 (FIG. 1) in accordance with an embodiment of the invention. The cell 200 includes a 64-byte cell portion 210. The 64-byte cell portion 210 includes a start-of-packet (SOP) flag 212, a MC flag 214, a priority field 216, an end-of-packet (EOP) flag 218, a test flag 220, a read OK (RDOK) flag 222, optional control data 224, and a payload 230-1 to 230-62 (collectively referred to as the payload 230). The data other than the payload may be referred to as header information. Additional header information may be attached to the 64-byte cell portion 210. The SOP flag 212 is set if a packet is broken into portions and the payload 230 of the cell 200 includes the first portion of the packet. A use for the SOP flag 212 is described with reference to FIG. 3, below. The MC flag 214 is set if the packet is a MC packet and not set if the packet is a unicast (UC) packet. The priority field 216 contains the priority of the packet. In an embodiment, different priorities are indicative of different traffic classes. In another embodiment, packets having different traffic classes are forwarded to and from and reassembled in different queues, as described with reference to FIG. 3, below. The EOP flag 218 is set if the payload 230 of the cell 200 includes the last portion of a packet. In an embodiment, the EOP flag 218 is optional. A use for the EOP flag 218 is described with reference to FIG. 3, below. The test flag 220 is set if the cell 200 includes a hardware test packet. Hardware test packets may be used to determine whether switching fabrics are available, or for other purposes. The RDOK flag 222 is set if reading of the cell 200 is allowed. The RDOK flag 222 is set during normal operation. The optional control data 224 is used to identify an egress port, check for and correct errors, or other uses. The details of the control data are not critical for the purpose of disclosing embodiments of the invention. The payload 230 includes a packet or a portion of a packet.

Figure 3:
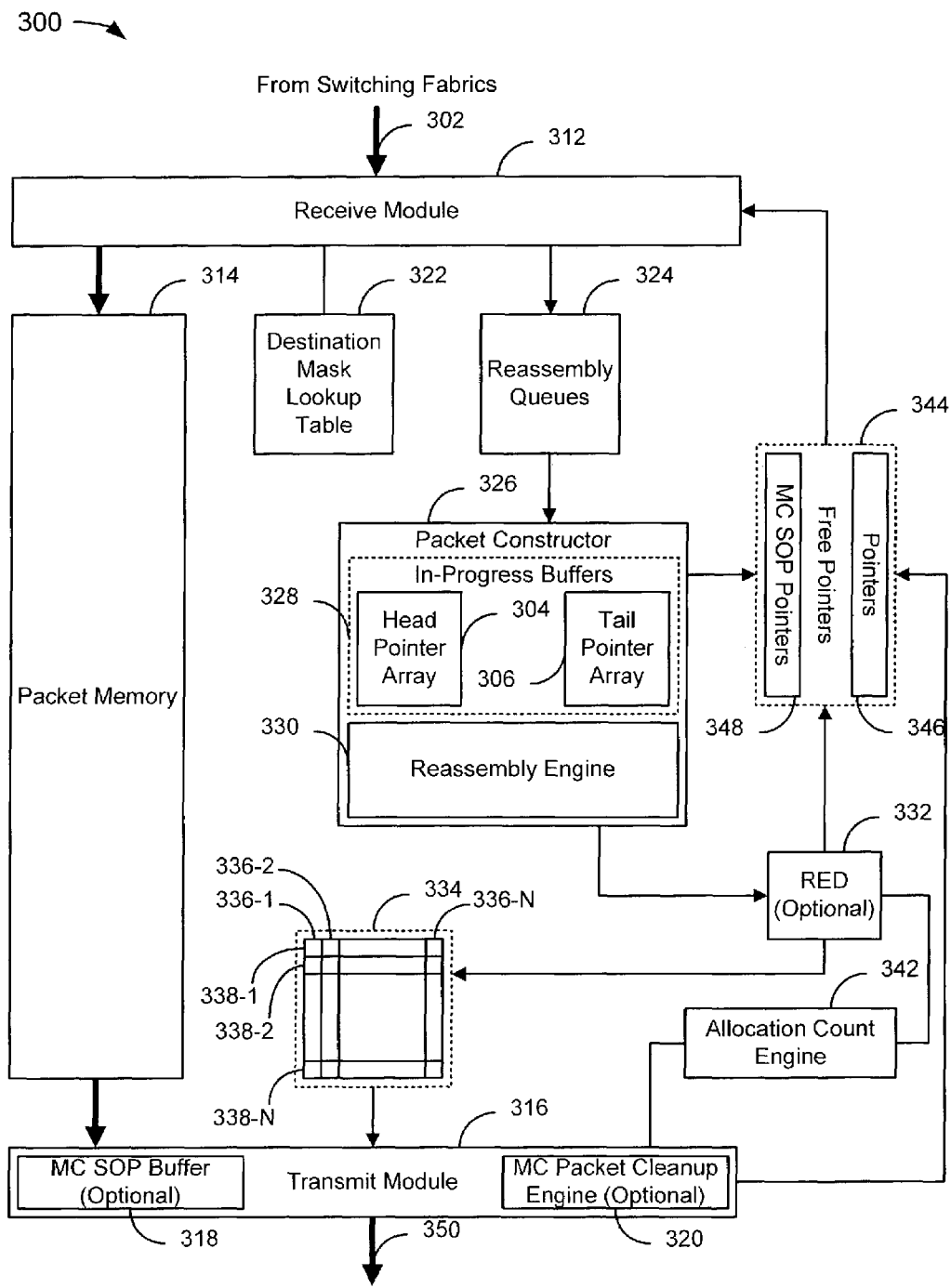
FIG. 3 is a block diagram of an egress module for use with the system of FIG. 1 in accordance with an embodiment of the invention.

FIG. 3 is a block diagram of an egress module 300 for use with the system 100 (FIG. 1) in accordance with an embodiment of the invention. In an embodiment, the egress module 300 is analogous to one of the egress modules 108 (FIG. 1). The egress module 300 includes a receive module 312, a packet memory 314, a transmit module 316, a destination mask lookup table 322, reassembly queues 324, a packet constructor 326, an optional random early discard (RED) block 332, packet queues 334, an allocation count engine 342, and free pointers buffer 344.

The ingress modules 106 (FIG. 1) send cells in order. The switching fabrics 130 (FIG. 1) then forward the cells to the egress module 300. When the cells arrive at the receive module 312 of the egress module 300, they may be out of order. This lack of order may be due to various reasons. For example, the cells may arrive through different switching paths. The receive module 312 receives cells from one or more switching fabrics on one or more high-speed interfaces (HSI) 302. In an embodiment, the receive module 312 includes a simple streaming buffer. The cells are stored in the packet memory 314. The packet memory 314 may be a dynamic random access memory (DRAM). In an embodiment, the packet memory 314 is an external DRAM (e.g., the DRAM is not on-chip). In an embodiment, the cells are written to the packet memory 314 once upon arrival from the HSI 302 and read once when transmitted on interface 350 from the transmit module 316. In another embodiment, MC packets are read once per transmission. Except for writes by the receive module 312 and reads by the transmit module 316, operations on cells or packets are actually on the pointers to the corresponding cells or packets.

In an embodiment, a MC packet is treated a bit differently than a UC packet. Accordingly, a different pointer is used to represent a cell depending upon whether the cell is a MC SOP cell or not. The free pointers buffer 344 includes pointers 346 and MC SOP pointers 348. The MC SOP pointer structure includes a main pointer, auxiliary pointers, and control information, which may include a SOP flag, EOP flag, and MC flag. The MC SOP pointer structure enables the egress module 300 to link a single packet onto more than one of the packet queues 334, as described later with reference to FIG. 4B. When the receive module 312 receives a MC SOP cell, in addition to assigning one of the MC SOP pointers, the receive module 312 consults the destination mask lookup table 322 to determine each destination of the cell. In an embodiment, the destination mask lookup table 322 is implemented in software. A MC SOP cell includes data from which the destinations of the MC packet can be determined. The data may be header information that is extracted from the MC SOP cell. An assigned MC SOP pointer is associated with one of the masks of the destination mask lookup table 322 according to this data. In an embodiment, the destination mask is included in control information associated with the MC SOP pointer. When the receive module 312 receives a cell other than a MC SOP cell, the cell is assigned one of the pointers 346. The pointer structure includes a cell token pointer and control information, which may include a SOP flag, EOP flag, and MC flag. The association of pointers—and MC SOP pointers and destination masks—is described with reference to FIG. 5A.

After a cell arrives at the receive module 312 and is associated with a pointer, the cell-(or, more specifically, the pointer to the cell) is directed to a reassembly queue of the reassembly queues 324 to await the arrival of more cells. In an embodiment including 64 ingress modules 106 (FIG. 1), 8 priorities (or, more generally, traffic classes), and 4 switching fabric modules 130 (FIG. 1), the egress module 300 includes a reassembly queue for cells from each of the ingress modules 106 of each traffic class received via each switching fabric module 130, for a total of up to 2048 (64 ingresses*8 traffic classes*4 fabrics) reassembly queues 324. Queues associated with the same ingress and traffic class may be referred to as a reassembly queue set. In other words, each reassembly queue set includes queues respectively associated with each fabric. Thus, in a 4-fabric alternative, each queue set includes four queues.

In an embodiment, the cells of a packet are maintained with a linked list with each node having a link to the next cell of the same packet and a link to the next packet in the same queue. The assignment of a pointer to a cell may be referred to as token assignment; the relatively small pointer (a token) represents the relatively large cell while the cell is stored in the packet memory 314. In an embodiment, cells are 64 bytes in size while pointers are only four bytes. In another embodiment, the tokenized cells are maintained in external static random access memory (SRAM). In another embodiment, pointers are assigned to each cell of a packet. The tokens are provided at the receive module 312 from the free pointers buffer 344.

The packet constructor 326 includes in-progress buffers 328 and a reassembly engine 330. The in-progress buffers 328 include head pointer array 304 and tail pointer array 306. The head pointer array 304 and tail pointer array 306 are used to keep track of packets as the reassembly engine 330 reassembles the packets from their component cells, as described with reference to FIG. 5B. The packet constructor 326 receives cells from the reassembly queues 324 when a reassembly queue set is complete. For example, in a 4-fabric alternative, cells are removed from the reassembly queues 324 in batches of four, when each queue of a reassembly queue set has a cell enqueued. Nevertheless, in an embodiment, the packet constructor 326 considers the cells received from the reassembly queues 324 one at a time (rather than four at a time). In an alternative, the packet constructor 326 both receives the cells one at a time and considers the cells one at a time.

The head pointer array 304 points to the SOP cell of packets that are being reassembled and the tail pointer array 306 points to the tails of the packets. Each head pointer of the head pointer array 304 is associated with a respective tail pointer of the tail pointer array 306. The reassembly engine 330 links the cells of the packet together in the packet memory starting with a SOP cell. A head pointer of the head pointer array 304 points to the SOP cell. Until the packet has been reassembled, however, since packets are reassembled cell-by-cell, the respective tail pointers do not point to an EOP cell. If a cell that is received at the packet constructor 326 is associated with a packet that is currently being constructed (i.e., at least the SOP cell of the packet has been associated with a head pointer), a next pointer associated with the last cell received for the packet is used to link the cell that was just received. Each time a new cell is added in this way, the tail pointer is modified to point to the newly added cell. In this way, the head pointer points to the SOP cell and the tail pointer points to the last cell added to the linked list. Once a packet has been reassembled, the cells of the packet are organized in a linked list starting with the SOP cell and ending with the EOP cell. Occasionally, a packet cannot be reconstructed. One reason packets cannot be reconstructed is that all of the cells are not received. In such cases, the pointers assigned to the incomplete packets are sent back to the free pointers buffer 344 for reuse with other packets. An exemplary packet reassembly procedure is described later with reference to FIG. 5B.

Packets that have been reassembled at the packet constructor 326 may be dropped at the RED block 332. The RED block 332 is an optional mechanism for managing traffic congestion in a manner that is well known in the art of packet-based traffic congestion management. For the purposes of RED, each destination of a MC packet is treated separately. Accordingly, one or more of the destinations may be dropped at the RED block 332, while other destinations are not dropped. The use of RED to determine which packets are either dropped or enqueued at the packet queues 334 is described with reference to FIG. 5C. FIG. 5C is also used to illustrate how the allocation count engine 342 transforms the destination mask of a multicast packet into an allocation count. In an embodiment, the allocation count engine 342 includes a 3-bit allocation count for each allocated MC head pointer, which corresponds to up to 8 destinations. The allocation count indicates the number of destinations of the MC packet minus the number of destinations that were dropped by the RED block 332. An alternative embodiment without the optional RED block 332 involves enqueuing reassembled packets in the packet queues 334 without using a RED algorithm to control traffic flow. Other traffic congestion control mechanisms may or may not be used instead of RED. Another alternative involves using the destination mask instead of the allocation count. In this alternative, the allocation count engine 342 modifies the destination mask. Accordingly, for the purposes of this application, the term allocation count is defined broadly to include either a count or a mask, such as the destination mask.

If a packet is not dropped or otherwise deleted, the packet is enqueued in the packet queues 334. The packet queues 334 include columns 336-1 to 336-N (collectively referred to as columns 336) and rows 338-1 to 338-N (collectively referred to as rows 338). There is a packet queue at each intersection of columns 336 and rows 338. Each packet queue is configured to queue packets that are directed to an associated destination. In an embodiment, there are five associated destinations. Each packet queue is also configured to queue packets that have an associated traffic class. In an embodiment, there are eight associated traffic classes. Since each column 336 of the packet queues 334 corresponds to a destination and a traffic class, if the transmit module 316 is configured to transmit a packet having one of eight traffic classes to one of five destinations, then there are 40 packet queues 334 (8 traffic classes*5 destinations). In an embodiment, the packet queues 334 are implemented using linked lists in an external SRAM.

In an embodiment, the MC SOP pointer is configured to occupy each column of the columns 336 across a single row of the rows 338 of the packet queues 334; this corresponds to every destination queue for a given traffic class. In an embodiment, each of the more than one of the packet queues 334 are associated with the same traffic class. This is because a MC packet with a first priority associated with a first destination does not have a second priority associated with a second destination. Rather, the MC packet will have the same priority associated with both the first and the second destinations. The MC SOP pointer only refers to one cell in the packet memory 314, but the MC SOP pointer occupies more than one of the packet queues 334. Thus, MC SOP pointers are somewhat expensive because the MC SOP pointers include pointers associated with each of the packet queues 334. MC SOP pointers are also more expensive due to the need to maintain an allocation count, as explained later with reference to FIG. 5C. The enqueuing of a MC packet is described later with reference to FIG. 4B.

When a packet is transmitted from the transmit module 316, the pointers associated with the packet are returned to the free pointers buffer 344. The transmit module 316 includes an optional MC SOP buffer 318 and an optional MC packet cleanup engine 320, both of which are used when transmitting a MC packet. The MC SOP buffer 318 remembers (e.g., stores for possible future use) a MC SOP. The MC SOP buffer 318 is optional because many methods of remembering the MC SOP are acceptable. The MC packet cleanup engine 320 recycles MC pointers after an MC packet is sent to each destination for which the MC packet has been enqueued. The MC packet cleanup engine 320 is optional because in an alternative, pointers associated with a packet are recycled as a cell is sent to the last of a set of destinations for which the packet is enqueued. The transmission of cells and recycling of pointers is described later with reference to FIG. 5D.

The MC SOP buffer 318 and MC packet cleanup engine 320 are valuable to facilitate maintaining a MC packet in the packet memory 314 until the cells associated with the MC packet have been transmitted to each destination to which the packet is directed. An alternative embodiment involves sending a packet to each valid destination, then releasing memory used to store the packet as each cell is sent. However, packet transmissions may occur in parallel. When packets are transmitted in parallel, there is no guarantee that starting to transmit to a first destination before a second destination means the first transmission will be completed before the second. Therefore, if memory is released when the transmission to the second destination begins, the second transmission could release memory before the first transmission reaches it, resulting in possible error. Accordingly, this alternative embodiment is less effective when packet transmission occurs in parallel.

Figure 4A:
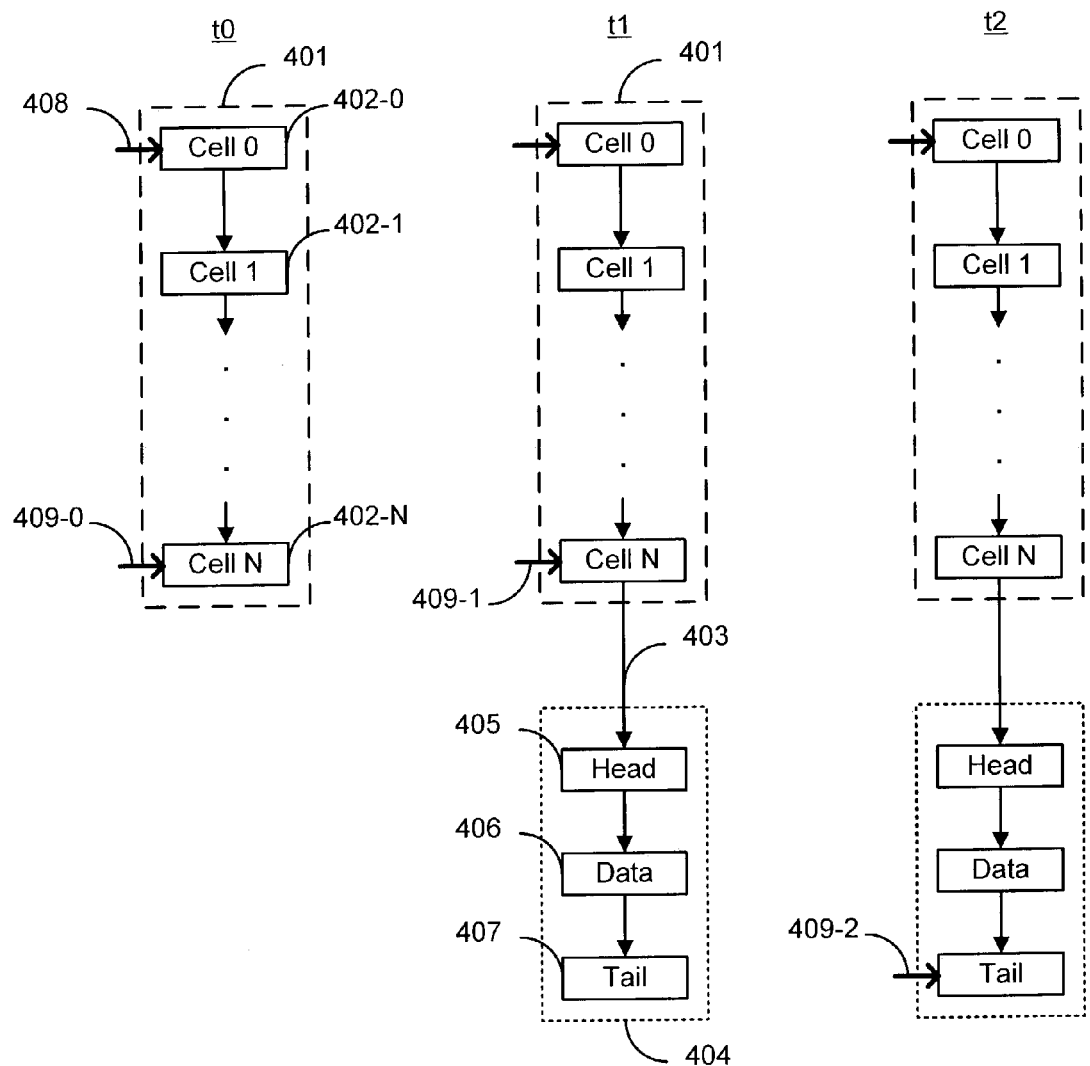
FIGS. 4A and 4B are a block diagrams of exemplary queues for use with the egress subsystem of FIG. 3 in accordance with an embodiment of the invention.

FIG. 4A is a block diagram of an exemplary queue 400A for use with the egress module 300 (FIG. 3) in accordance with an embodiment of the invention. The queue 400A is analogous to one of the packet queues 334 (FIG. 3) at three exemplary times, t0, t1, and t2. FIG. 4A is intended to illustrate the appending of a linked list associated with a reassembled UC packet to a packet queue, in an embodiment where the packet queue is represented as a linked list. At time to, the queue 400A includes a linked list 401 with cells 402-0 to 402-N (collectively referred to as cells 402), a head pointer 408 that is associated with cell 402-0, and a tail pointer 409-0 that is associated with cell 402-N. Note that the tail pointer designation is 409-0 at time t0, 409-1 at time t1, and 409-2 at time t2. Each of the cells (other than the cell 402-N) is linked to a next cell with a next pointer. At time t1, a packet 404, including a head cell 405, data cells 406, and a tail cell 407, is linked to the linked list 401 via a link 403. The link 403 is the next pointer of the cell at which the tail pointer 409-1 points. Thus, the linked list 401 and packet (represented as a linked list) is accomplished with a single write operation to the next pointer of the last cell of the linked list 401. The linkage is completed at time t2 when the tail pointer 409-2 points at the tail cell 407. It should be noted that the cells 402 may or may not be associated with a plurality of packets. The linked list 401 could also be empty, in which case, at time t2, the head pointer 408 would point to the head cell 405 and the tail pointer 409-2 would point to the tail cell 407. It should also be noted that the packet 404 could be a single-cell packet. In this case, the head cell 405, data cells 406, and tail cell 407 would be included in a single head/tail cell (not illustrated). Similarly, the packet 404 may be a two-cell packet that does not have any data cells 406.

Figure 4B:
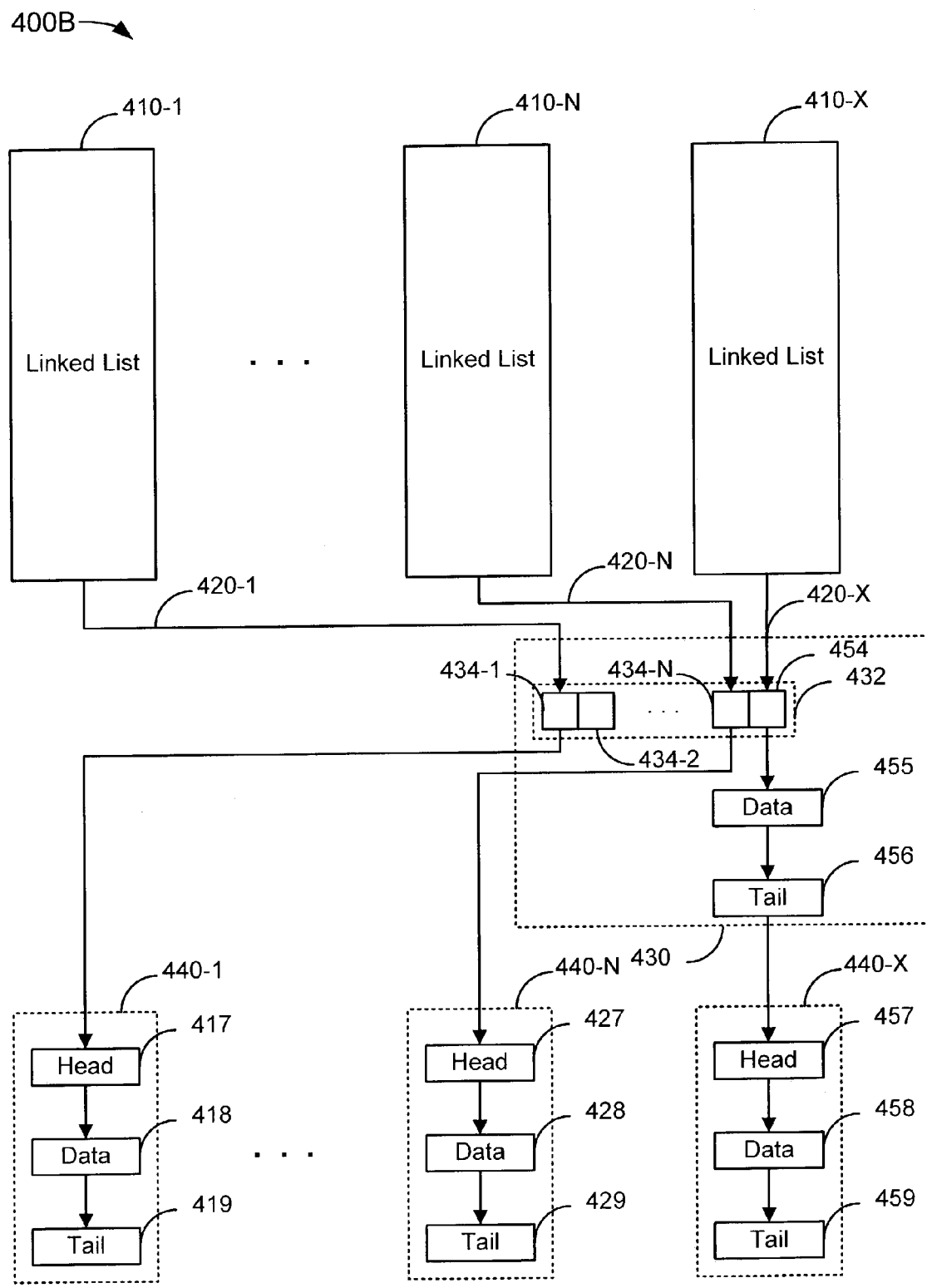

FIG. 4B is a block diagram of exemplary queues 400B for use with the egress module 300 (FIG. 3) in accordance with an embodiment of the invention. The queues 400B are analogous to the packet queues 334 (FIG. 3). FIG. 4B is intended to illustrate the appending of a linked list associated with a reassembled MC packet to one or more packet queues, where the packet queues are also represented as linked lists. The queues 400B include linked lists 410-1 to 410-N and 410-X (collectively referred to as the linked lists 410) coupled to a MC linked list 430 via links 420-1 to 420-N and 420-X (collectively referred to as the links 420), and reassembled packet linked lists 440-1 to 440-N and 440-X (collectively referred to as linked lists 440). Each of the queues 410 is associated with a different destination. The MC linked list 430 includes a MC SOP pointer 432 including auxiliary pointers 434-1 to 434-N (collectively referred to as auxiliary pointers 434) and a main pointer 454. Links 420 respectively couple the linked lists 410 to the auxiliary pointers 434 and main pointer 454. The main pointer 454 acts as a head cell and is linked to the data cells 455 and tail cell 456 associated with the head cell. In other words, the main pointer 454, data cells 455, and tail cell 456 together represent a packet much like the linked list 404 (FIG. 4A) represents a packet. The linked list 440-1 includes head cell 417, data cells 418, and tail cell 419; the linked list 440-N includes head cell 427, data cells 428, and tail cell 429; and the linked list 440-X includes head cell 457, data cells 458, and tail cells 459. The auxiliary pointers 434 and the tail cell 456 are respectively coupled to packets represented as linked lists 440.

One exemplary way to create the queue 400B is as follows. At some time prior to time t0, the MC linked list 430 was assembled in much the same manner as the linked list 404 (FIG. 4A), where the main pointer 454, data cells 455, and tail cell 456 are respectively analogous to the head cell 405, data cells 406, and tail cell 407 (FIG. 4A). The main pointer 454 is associated with a first destination and the auxiliary pointers 434 are associated with other destinations. Until linked in the manner described below, however, the auxiliary pointers 434 are null. At time t0, the queues 400B include the linked lists 410, but do not include links 420, MC linked list 430, or linked lists 440.

At time t1, each of the linked lists 410 that have a destination to which the packet is directed are linked to the MC linked list 430. The linked lists 410, other than linked list 410-X, are respectively associated with the auxiliary pointers 434. Accordingly, if one of the linked lists 410, other than linked list 410-X, is linked to the MC linked list 430, it is by arbitrary definition linked to a predetermined one of the auxiliary pointers 434. Linked list 410-X, on the other hand, is coupled to the main pointer 454. If one of the linked lists 410, e.g., linked list 410-2 (not illustrated), is associated with a destination to which the packet is not directed, the link 420-2 (not illustrated) would not link to the auxiliary pointer 434-2. Similarly, if the linked list 410-X is associated with a destination to which the packet is not directed, the link 420-X would not link to the main pointer 454. In this case, the tail cell 456 would have a null next cell pointer.

At time t2, a tail pointer associated with the linked list 410 points to the tail cell 456. The tail pointers associated with the linked lists 410-1 to 410-N respectively point to the auxiliary pointers 434-1 to 434-N. Of course, if one or more of the linked lists 410 are not linked to the MC linked list 430, then their respective tail pointers do not point to any part of the linked list 430.

At some time after t2, additional linked lists 440 are linked via the next pointer of an auxiliary pointer 434 or via the next pointer of the tail cell 456. FIG. 4B illustrates additional UC linked lists 440, but MC linked lists (not illustrated) may also be linked in a manner that is apparent from the above descriptions of FIGS. 4A and 4B.

Figure 5A:
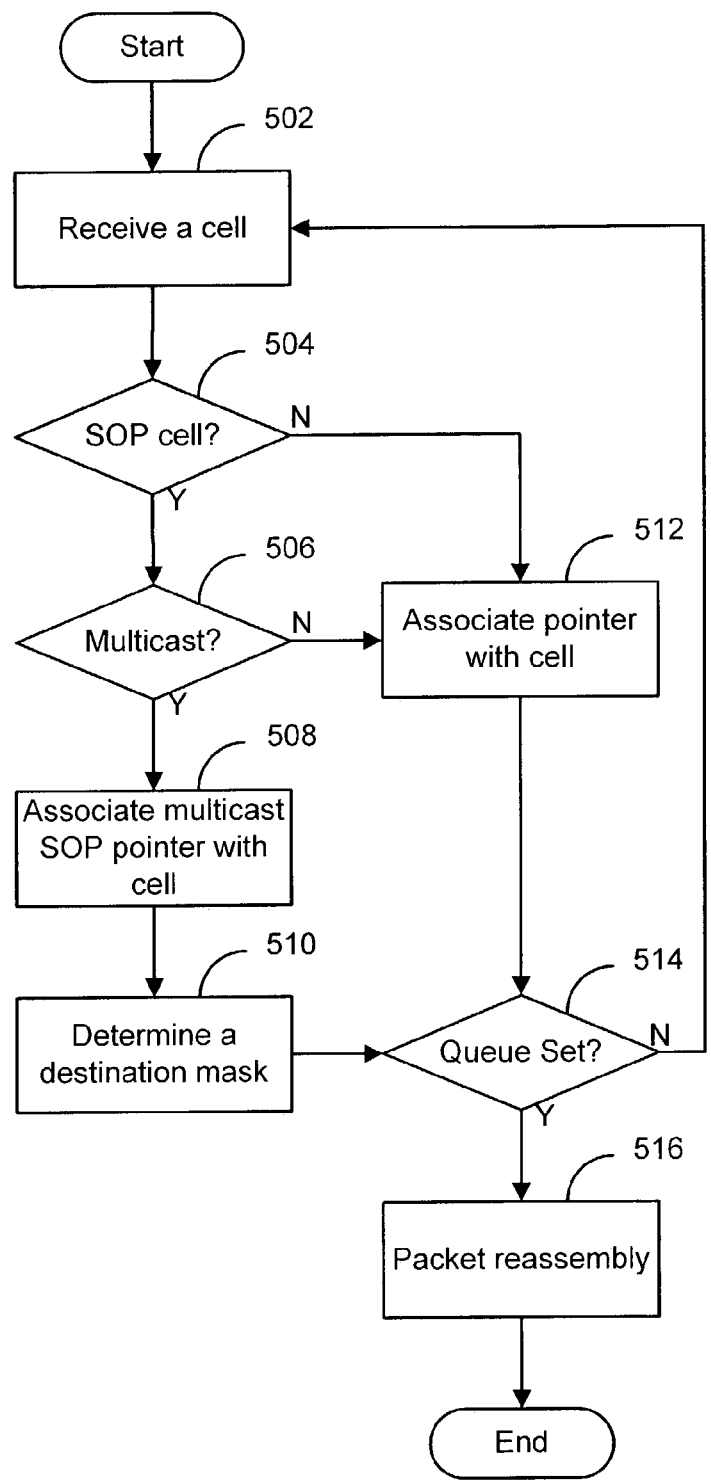
FIGS. 5A to 5D are flowcharts of methods in accordance with embodiments of the invention.

FIG. 5A is a flowchart 500A of a method in accordance with an embodiment of the invention. The flowchart 500A is intended to illustrate the receipt of cells of a packet until a reassembly queue set is full. Then the cell is sent, along with the other cells in the same reassembly queue set, to packet reassembly.

The flowchart 500A starts with receiving a cell at step 502. Then it is determined at decision point 504 whether the cell is a SOP cell. If so, then it is determined at decision point 506 whether the SOP cell is a MC SOP cell. If so, then a MC SOP pointer is associated with the cell at step 508 and a destination mask is determined by checking the MC SOP cell header information or payload for the destinations of the MC SOP cell at step 510. If either the cell is not a SOP cell (504-N) or the cell is not multicast (506-N), then a pointer is associated with the cell that is not a MC SOP pointer. In any case, it is determined at decision point 514 whether each cell of a reassembly queue set has been received. If so, then the cell is sent to packet reassembly at step 516 and the flowchart ends. If not, then the flowchart 500A returns to step 502 to receive another cell and the flowchart 500A continues as described previously until the reassembly queue set is full. It should be noted that in an alternative, the reassembly queue set could be full when only one cell is received. In this alternative, steps 510 and 512 would proceed directly to step 516.

Figure 5B:
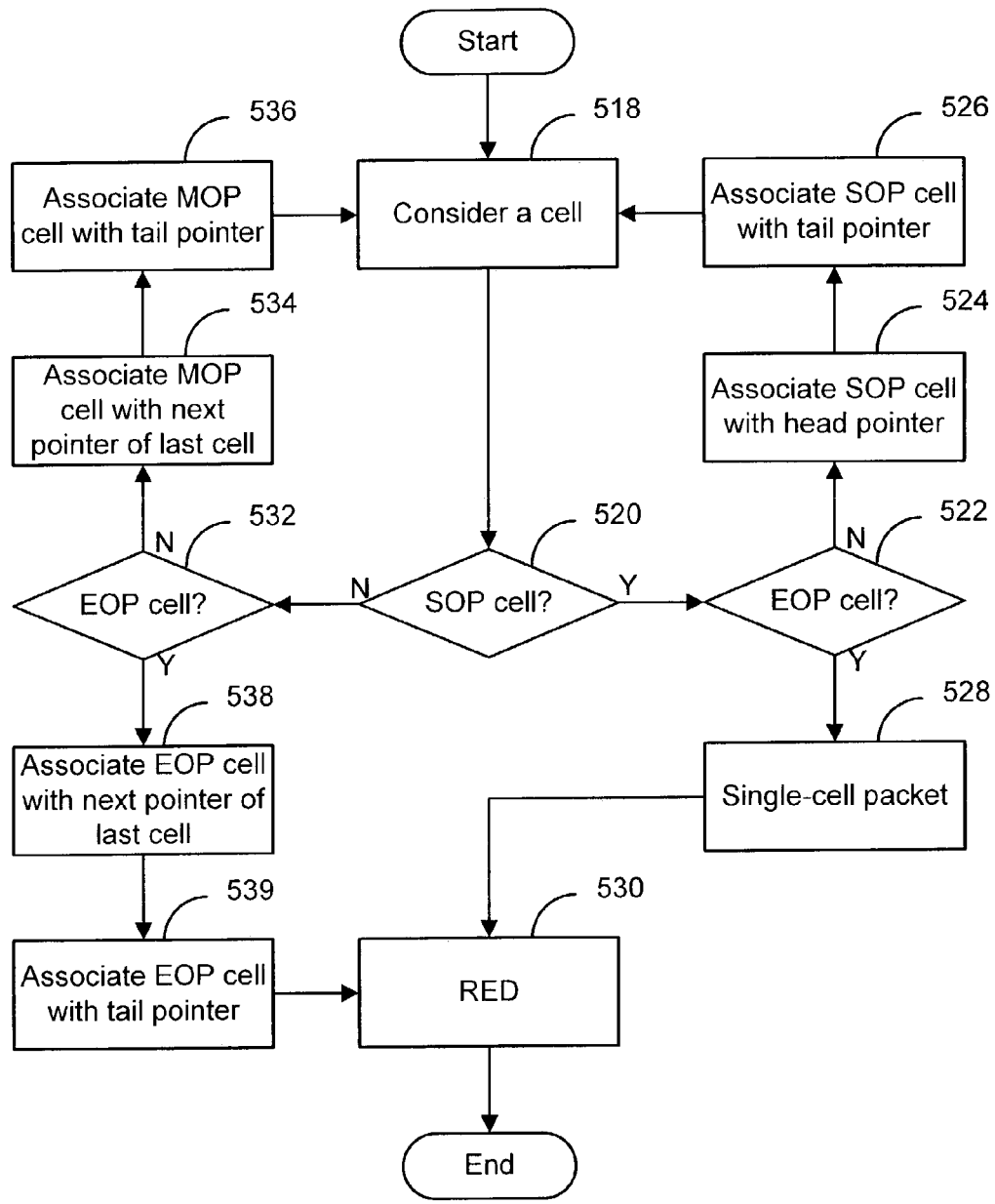
Figure 5C:
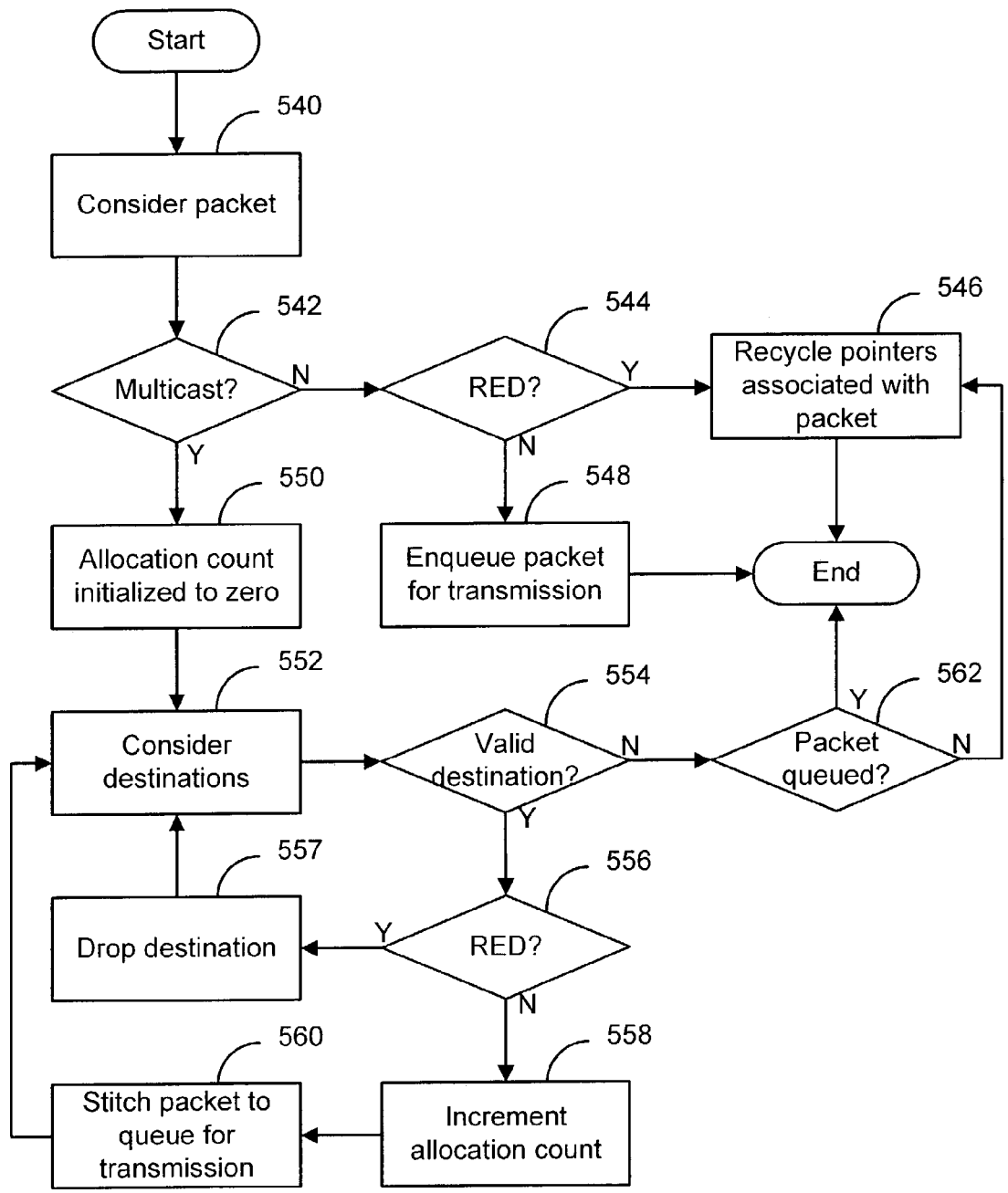

FIG. 5B is a flowchart 500B of a method in accordance with an embodiment of the invention. The flowchart 500B is intended to illustrate the reassembly of cells into packets. The flowchart 500B starts with receiving a cell and ends when the packet with which the cell is associated is reassembled. It should be noted that even if a plurality of cells are received as a reassembly queue set, in accordance with the description of FIG. 5A, the cells are considered one at a time for the purposes of packet reassembly.

The flowchart 500B starts at step 518 with considering a cell. It is determined at decision point 520 whether the cell is a SOP cell. Regardless of whether the cell is an SOP cell, it is determined whether the cell is an EOP. If the cell is a SOP cell, then it is determined at decision point 522 whether the cell is an EOP cell. If the cell is not a SOP cell, then it is determined at decision point 532 whether the cell is an EOP cell. If the SOP cell is not an EOP cell (522-N), then the SOP cell is associated with a head pointer at step 524, the SOP cell is associated with a tail pointer at step 526, and a next cell is considered at step 518. Since the SOP cell is the only cell in the in-progress packet, it is both the first cell, which is why it is associated with the head pointer, and the last cell, which is why it is associated with the tail pointer. If the SOP cell is an EOP cell (522-Y), then the SOP cell is a single-cell packet at step 528, the packet is sent to RED at step 530, and the flowchart 500B ends. In an embodiment, a head pointer is not associated with single-cell packets, because no reassembly is required. When the cell received is not an SOP cell (520-N) and is also not an EOP cell (532-N), the cell is a MOP cell. In this case, the MOP cell is associated with the next pointer of a last cell of the same packet at step 534, the MOP cell, since it is the last cell to be added, is associated with the tail pointer at step 536, and a next cell is considered at step 518. When the cell received is not an SOP cell (520-N), but is an EOP cell (532-Y), then the EOP cell is associated with the next pointer of the last cell at step 538, the EOP cell is associated with the tail pointer at step 539, and the flowchart 500B ends.

FIG. 5C is a flowchart 500C of a method in accordance with an embodiment of the invention. The flowchart 500C is intended to illustrate the queuing of a packet for transmission. The flowchart 500C starts with considering a packet and ends with the packet being enqueued.

The flowchart 500C starts at step 540 with considering a packet. It is determined at decision point 542 whether the packet is a MC packet. If not, then the packet is a UC packet and it is determined at decision point 544 whether to drop the packet according to a RED algorithm. If the packet is dropped, the pointers associated with the packet are recycled at step 546 and the flowchart 500C ends. In an embodiment, all of the pointers associated with a UC packet are the same data structure. Accordingly, when the pointers are recycled, they are placed back into the same pool of pointers for use by other packets. If the packet is not dropped, the packet is enqueued in the queue associated with the destination and traffic class of the packet at step 548 and the flowchart 500C ends.

If the packet is a MC packet (542-Y), an allocation count associated with the packet is initialized to zero at step 550. Then, destinations associated with the packet are considered at step 552. In an embodiment, the valid destinations are determinable from a destination mask. An alternative includes a destination bit mask where each bit represents a destination. If a bit is set to '1', then the destination is valid. If a bit is set to '0', then the destination is not valid. It is determined at decision point 554 whether any valid destinations remain. If so, it is determined at decision point 556 whether to drop the valid destination according to a RED algorithm. If the destination is not dropped, then the allocation count is incremented at step 558, the packet is stitched into a queue for transmission at step 560, and the destinations are considered again at step 552. In an embodiment, when the allocation count is incremented at step 558, a destination mask is modified such that the destination is no longer valid. This ensures that the packet will not be stitched into the same queue more than once. In another embodiment, the packet has an MC SOP pointer that includes auxiliary pointers (and, in an alternative, a main pointer) associated with each destination. When the packet is stitched into a queue at step 560, the auxiliary pointer associated with the destination being considered is used. If it is determined that the destination should be dropped according to RED (556-Y), then the destination is dropped at step 557. In an embodiment, a destination mask is modified such that the destination is no longer valid. After dropping the destination, the remaining destinations are considered at step 552 and the flowchart 500C continues as described above until at decision point 554 it is determined that no valid destinations remain. When no valid destinations remain, it is determined at decision point 562 whether the packet has been enqueued. In an embodiment, the packet has not been enqueued if the allocation count is zero. If the packet has been enqueued, then the flowchart 500C ends. Otherwise, the pointers associated with the packet are recycled. In an embodiment, a MC SOP pointer is different from the rest of the pointers. Accordingly, the MC SOP pointer is placed in a first pool of pointers and the rest of the pointers (MOP and EOP) are placed in a second pool of pointers.

Figure 5D:
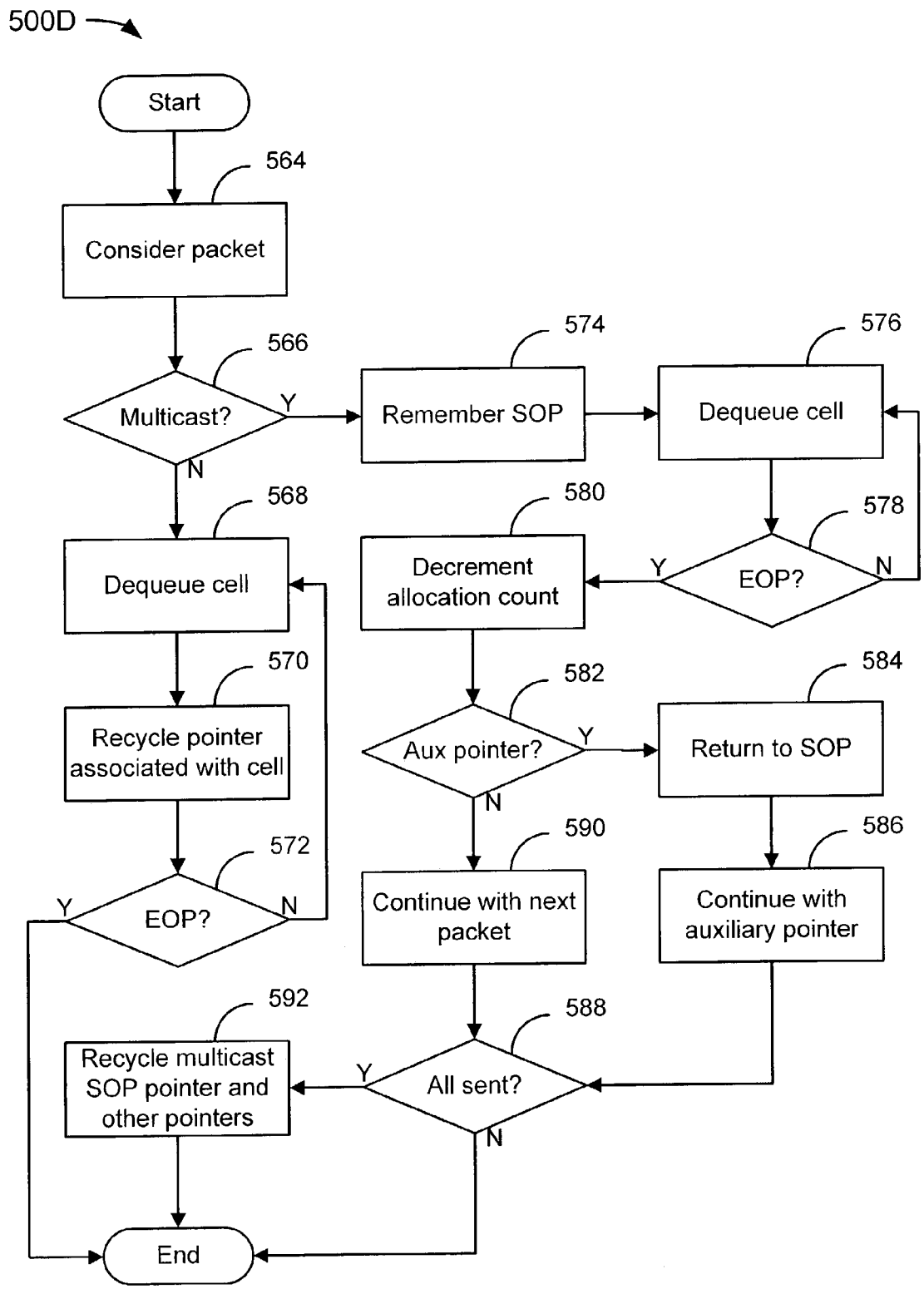

FIG. 5D is a flowchart 500D of a method in accordance with an embodiment of the invention. The flowchart 500D is intended to illustrate the dequeuing of a packet for transmission and recycling of pointers associated with the packet. The flowchart 500D represents a single queue. Accordingly, for a UC packet, the flowchart 500D ends with dequeuing the cells of the packet and recycling of the associated pointers. However, since a MC packet may be stitched across multiple queues, the flowchart 500D ends with dequeuing the cells, but may or may not end with recycling the associated pointers.

The flowchart 500D starts at step 564 with considering a packet. It is determined at decision point 566 whether the packet is a MC packet. If not, then the packet is a UC packet so a cell is dequeued at step 568, the pointer associated with the cell is recycled at step 570 and it is determined at decision point 572 whether the cell was an EOP cell. If not, then steps 568 to 572 are repeated for subsequent cells of the packet until the EOP cell is dequeued, at which point the flowchart 500D ends.

If the packet is a MC packet (566-Y), then the location of the MC SOP pointer is remembered for the packet at step 574, the SOP cell is dequeued at step 576, and it is determined whether the SOP cell is an EOP cell at decision point 578. If the SOP cell is not an EOP cell, subsequent cells of the packet are dequeued until the EOP cell is dequeued. In an embodiment, when cells are dequeued, they are transmitted (not illustrated). Then an allocation count associated with the packet is decremented at step 580. The allocation count represents the number of destinations to which the packet is directed, but not yet sent. Next, it is determined whether the queue from which the cells were dequeued is associated with an auxiliary pointer of the MC SOP pointer. If so, then the linked list returns to the MC SOP pointer at step 584, and continues from the next pointer of the auxiliary pointer at step 586. If not, then the linked list continues from the next pointer of the last cell (the EOP cell) dequeued. In either case, it is determined at decision point 588 whether the packet has been sent to all destinations to which it is directed. If not, the flowchart 500D ends (and the linked list continues as indicated at step 586 or 590, as applicable). If so, the MC SOP pointer and other pointers are recycled at step 592 and the flowchart 500D ends.

Though it is possible to execute the steps and decision points in a different order, one reason to execute step 592 after a packet has been dequeued for all valid destinations is that packets may be transmitted in parallel. Consider, for example, a MC packet with two valid destinations, a first and a second. The SOP cell is transmitted to the first destination. Then, prior to transmitting the EOP cell to the first destination, the SOP cell is transmitted to the second destination. At this point, if the memory associated with the SOP cell is released, since the cell has been transmitted to all valid destinations, there will likely be no error even if the memory location is overwritten before the EOP cell is transmitted to the first and second destinations. However, consider what happens when, due to relative delay in transmission to the first destination, the EOP cell is transmitted to the second destination before it is transmitted to the first. In this case, the memory associated with the EOP cell should be released after the EOP cell is transmitted to the first destination. Accordingly, memory should not be released as each cell is transmitted to the second destination, even though the SOP could be released in this manner without error. One solution to the problem of ensuring that no memory is released until the cell associated with the memory has been sent to all valid destinations is to wait until all cells of a packet have been sent, as shown with decision point 588. After all cells are transmitted, a clean-up procedure is executed to release memory. The clean-up entails returning to the SOP and releasing the memory associated with cells as the clean-up procedure progresses to the EOP. Therefore, even though it may be more efficient to recycle pointers as cells are sent, in an embodiment where packets are transmitted in parallel, an alternative includes a clean-up procedure.

Figure 6A:
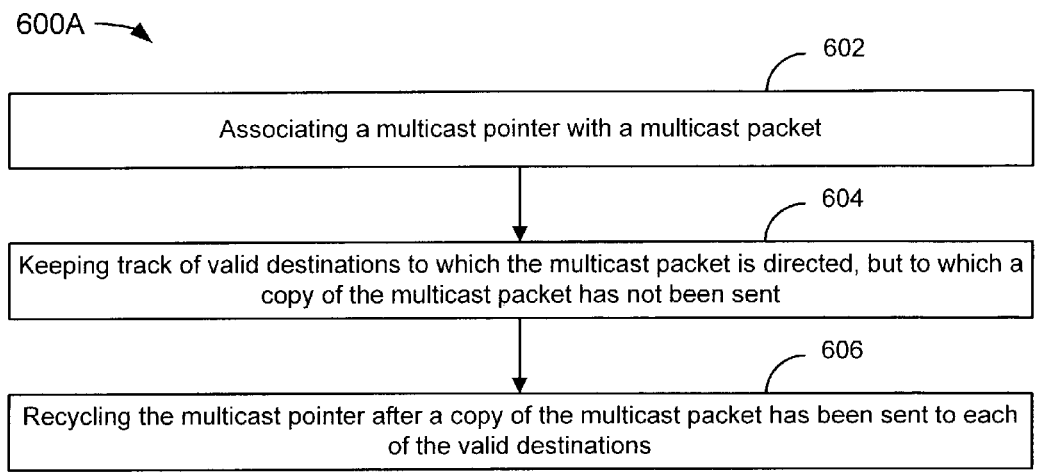
FIGS. 6A and 6B are flowcharts of methods in accordance with embodiments of the invention.

FIG. 6A is a flowchart 600A of a method in accordance with an embodiment of the invention. FIG. 6A is intended to illustrate that a MC pointer is recycled after a copy of the MC packet associated with the MC pointer is sent to every valid destination. The flowchart 600A starts with associating a multicast pointer with a multicast packet at step 602. Then, at step 604, keeping track of valid destinations to which the multicast packet is directed, but to which a copy of the multicast packet has not been sent. And, at step 606, recycling the multicast pointer after a copy of the multicast packet has been sent to each of the valid destinations.

Figure 6B:
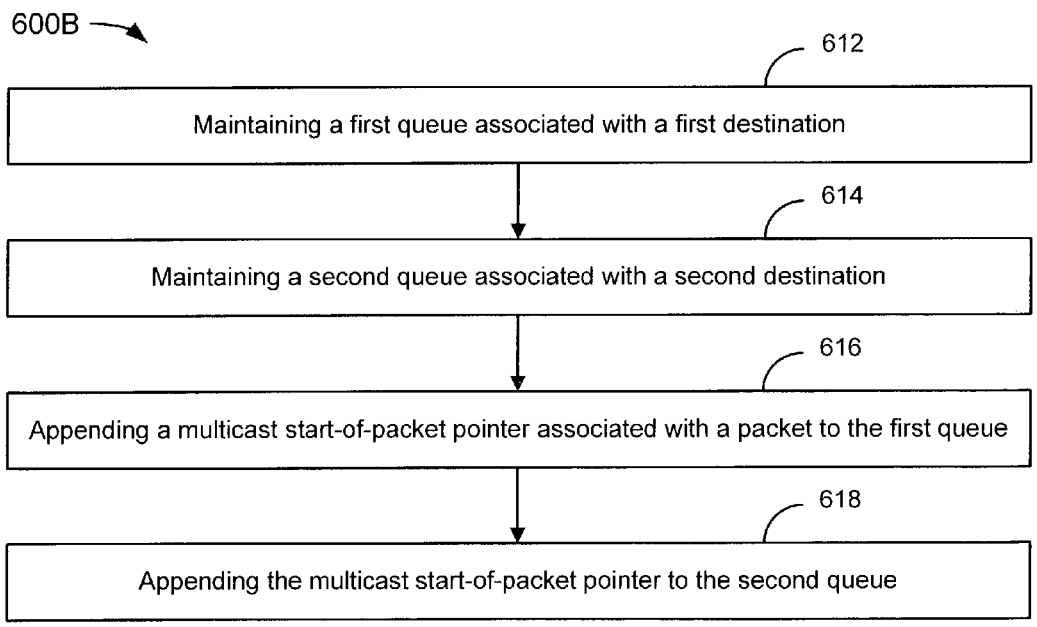

FIG. 6B is a flowchart 600B of a method in accordance with an embodiment of the invention. FIG. 6B is intended to illustrate that a MC SOP pointer is enqueued on each queue associated with a valid destination of the packet associated with the MC SOP pointer. The flowchart 600B starts with maintaining a first queue associated with a first destination at step 612 and maintaining a second queue associated with a second destination at step 614. Then, at step 616, enqueuing a MC SOP pointer associated with a packet on the first queue and, at step 618 enqueuing the multicast SOP pointer on the second queue.

In one embodiment, the method steps described above are embodied in a computer-readable media as computer instruction code. It shall be appreciated that not all methods steps described must be performed, nor must they be performed in the order stated.

The term packet is defined broadly to include fixed-length cells, variable length packets, and encapsulated data. A packet could be broken into a plurality of smaller cells. As used herein, the term packet could refer to a flow of the plurality of cells or a single cell of such a flow.

The term destination is defined broadly to include a final destination for a packet or a next hop in a transmission path.

The term pointer is defined broadly to include data structures having one or more token cell pointer fields. Packets may also include a header. The header may include control information.

Although specific embodiments of the invention have been described and illustrated, the invention is not to be limited to the specific forms or arrangements of parts as described and illustrated herein. The invention is limited only by the claims.

What is claimed is:

1. A method of queuing multicast packets for transmission to multiple destinations, comprising:
  associating a multicast pointer with a multicast packet;
  enqueuing copies of the multicast pointer in multiple destination queues, wherein each copy of the multicast pointer is associated with a destination;
  keeping track of valid destinations to which the multicast packet is directed, but to which a copy of the multicast packet has not been sent; and
  recycling the multicast pointer after a copy of the multicast packet is sent to each of the valid destinations.

2. The method of claim 1, further comprising:
  receiving a first cell of said multicast packet, wherein said associating specifically associates said multicast pointer with the first cell of said multicast packet.

3. The method of claim 2, further comprising:
  determining a destination mask using information associated with said multicast packet; and
  associating the destination mask with said multicast pointer.

4. The method of claim 1, further comprising:
  receiving said multicast packet;
  storing said multicast packet in packet memory;
  sending a copy of said multicast packet to one of said valid destinations; and
  updating information associated with said multicast pointer.

5. The method of claim 4, wherein said multicast pointer is a start-of-packet (SOP) pointer, further comprising:
  associating other pointers with said multicast packet such that each cell of the packet is specifically associated with a pointer, wherein the SOP cell of the packet is specifically associated with a SOP pointer;
  enqueuing said SOP pointer at a plurality of queue locations; and
  enqueuing an end-of-packet (LOP) pointer at fewer than said plurality of queue locations.

6. The method of claim 5, further comprising:
  dequeuing said multicast packet; and
  updating information associated with said SOP pointer.

7. The method of claim 6, further comprising:
  dequeuing a next packet at a queue location identified by an auxiliary pointer from said SOP pointer.

8. The method of claim 4, further comprising:
  performing random early drop (RED) on said multicast packet; and
  dropping one or more valid destinations in accordance with said performing.

9. The method of claim 1, further comprising:
  associating a unicast pointer with a unicast packet;
  storing the unicast packet in packet memory;
  sending the unicast packet from packet memory; and
  recycling the unicast pointer.

10. A method of queuing multicast packets for transmission to multiple destinations, comprising:
  maintaining a first queue associated with a first destination;

maintaining a second queue associated with a second destination;
enqueuing a multicast staff-of-packet (SOP) pointer associated with a packet on the first queue;
enqueuing the multicast SOP pointer on the second queue; and
recycling a multicast pointer after a copy of a multicast packet is sent to each destination for which the multicast packet has been enqueued.

11. The method of claim 10, further comprising:
traversing said first queue through said multicast SOP pointer to an end-of-packet (LOP) pointer associated with said packet.

12. The method of claim 11, further comprising:
continuing to traverse said first queue from said LOP pointer.

13. The method of claim 11, further comprising:
returning to said multicast SOP pointer; and
continuing to traverse said first queue through an auxiliary pointer associated with said multicast SOP pointer and said first queue.

14. The method of claim 11, further comprising:
traversing from said second queue through said multicast SOP pointer to said LOP pointer.

15. The method of claim 10, further comprising:
determining that said packet has been sent to each valid destination to which the packet is directed; and
recycling said multicast SOP pointer.

16. A system for queuing multicast packets for transmission to multiple destinations, comprising:
a receive module configured to:
receive cells, including a first cell and a second cell;
determine that the first cell is a multicast start-of-packet (SOP) cell;
establish that the second cell is a unicast SOP cell;
associate a first type of pointer with the first cell in accordance with said determination; and
associate a second type of pointer with the second cell in accordance with said establishing;
a plurality of packet queues configured to:
enqueue the pointer associated with the first cell in a subplurality of the plurality of packet queues; and
enqueue the pointer associated with the second cell in one of the plurality of packet queues;
wherein the first cell is associated with a first packet and the second cell is associated with a second packet;
a transmit module configured to transmit the packets;
a multicast packet cleanup engine configured to recycle a multicast pointer after a copy of a multicast packet is sent to each destination for which the multicast packet has been enqueued.

17. The system of claim 16, wherein the receive module is further configured to:
determine whether a received cell is not a multicast SOP cell; and
associate the second type of pointer with the received cell.

18. The system of claim 16, further comprising:
a free pointers buffer with a first list of pointers of said first type and a second list of pointers of said second type, wherein each pointer of said first type includes a main pointer and an auxiliary pointer; and
a packet constructor configured to reassemble packets from the received cells.

19. The system of claim 16, further comprising:
a destination mask lookup table, wherein each destination mask identifies a set of destinations for said reassembled packets,
wherein said receive module is further configured to:
look up a destination mask using data associated with said first cell; and
associate the destination mask with said first cell.

20. The system of claim 19, further comprising:
packet memory configured to store the received cells,
wherein the transmit module is further configured to release memory in which a packet, including said first cell, is stored in the packet memory when said packet is transmitted to each valid destination of said set of locations.

* * * * *

UNITED STATES PATENT AND TRADEMARK OFFICE
CERTIFICATE OF CORRECTION

| | | |
|---|---|---|
| PATENT NO. | : 7,609,693 B2 | Page 1 of 1 |
| APPLICATION NO. | : 10/443505 | |
| DATED | : October 27, 2009 | |
| INVENTOR(S) | : Anderson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1923 days.

Signed and Sealed this

Twelfth Day of October, 2010

David J. Kappos
*Director of the United States Patent and Trademark Office*